United States Patent
Liao et al.

(10) Patent No.: US 12,448,494 B2
(45) Date of Patent: *Oct. 21, 2025

(54) TREATMENT METHOD OF WASTE FABRIC CONTAINING POLYESTER FIBER AND ELASTIC FIBER

(71) Applicant: NAN YA PLASTICS CORPORATION, Taipei (TW)

(72) Inventors: Te-Chao Liao, Taipei (TW); Jung-Jen Chuang, Taipei (TW); Tzu-Huan Wong, Hualien County (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 676 days.

This patent is subject to a terminal disclaimer.

(21) Appl. No.: 17/874,262

(22) Filed: Jul. 26, 2022

(65) Prior Publication Data
US 2023/0130708 A1    Apr. 27, 2023

(30) Foreign Application Priority Data

Oct. 25, 2021 (TW) ................. 110139420

(51) Int. Cl.
*C08J 11/08* (2006.01)

(52) U.S. Cl.
CPC ............ *C08J 11/08* (2013.01); *C08J 2367/02* (2013.01); *C08J 2475/04* (2013.01)

(58) Field of Classification Search
USPC ............................ 521/48; 528/190, 193, 194
See application file for complete search history.

(56) References Cited

U.S. PATENT DOCUMENTS

2005/0096400 A1   5/2005   Villwock et al.
2020/0157307 A1   5/2020   Guo

FOREIGN PATENT DOCUMENTS

| CN | 103374144 A | 10/2013 | |
| CN | 106279759 A | 1/2017 | |
| CN | 110734578 A | 1/2020 | |
| CN | 110790980 A | 2/2020 | |
| CN | 112763370 A | 5/2021 | |
| JP | 200347928 A | 2/2003 | |
| JP | 200353394 A | 2/2003 | |
| JP | 200831127 A | 2/2008 | |
| JP | 2011088943 A | * 5/2011 | ............ B29B 17/02 |
| JP | 2014188399 A | 10/2014 | |

OTHER PUBLICATIONS

JP-2011088943-A Machine Translation (Year: 2011).*
Wei Luo,Yan-Yun Sun,Shu-Run Li,Fong-Wu Chen, "Research of reuse technologies of abandoned textiles", Chemical Enterprise Management,Apr. 1, 2017.

* cited by examiner

Primary Examiner — Terressa Boykin
(74) Attorney, Agent, or Firm — Li & Cai Intellectual Property Office

(57) ABSTRACT

A treatment method of waste fabric containing polyester fiber and elastic fiber is provided. The method includes the steps of using at least one polar solvent to perform at least a two-stage separation treatment on the waste fabric and recycling the waste fabric after the treatment. The at least one polar solvent is selected from the group consisting of dimethylformamide (DMF), dimethylacetamide (DMAC), N-methylpyrrolidone (NMP), gamma-butyrolactone (GBL), and dimethylsulfoxide (DMSO).

11 Claims, 4 Drawing Sheets

TREATMENT METHOD OF WASTE FABRIC CONTAINING POLYESTER FIBER AND ELASTIC FIBER

CROSS-REFERENCE TO RELATED PATENT APPLICATION

This application claims the benefit of priority to Taiwan Patent Application No. 110139420, filed on Oct. 25, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a technology for recycling waste fabric, and more particularly to a treatment method of waste fabric containing a polyester fiber and an elastic fiber, which is to separate the elastic fiber from the waste fabric by at least a two-stage solvent treatment, thereby recycling the elastic fiber.

BACKGROUND OF THE DISCLOSURE

With the improvement of people's living standards and levels of consumption, the service cycle of textiles is greatly shortened, resulting in a large number of waste textiles being produced. Among them, polyester fiber/elastic fiber blended textiles account for a certain proportion, but such blended textiles are not easily recycled and are likely to have adverse effects on the environment after disposal. From the perspective of environmental protection and resource conservation, recycling is the most ideal way to deal with waste textiles.

At present, there are three main recycling methods for recycling waste textiles, namely physical recycling, energy recycling and chemical recycling methods. The physical recycling method is to preliminarily process waste textiles into a state that can be reused; for instance, cutting discarded clothes into small pieces to be used as rags, or repairing and refurbishing waste carpets that are not badly damaged. The energy recycling method is to incinerate chemical fiber with high calorific value in waste textiles to generate heat energy for power generation, and the energy recycling method is suitable for processing certain types of waste textiles that cannot be recycled. The chemical recycling method is to depolymerize high molecular polymers in waste textiles, and then use the depolymerization products such as monomers to produce new chemical fibers. The chemical recycling method has achieved preliminary results in the recycling and reuse of certain high-value chemical polymer materials.

SUMMARY OF THE DISCLOSURE

In response to the above-referenced technical inadequacies, the present disclosure provides a treatment method of waste fabric containing polyester fiber and elastic fiber, which has the advantages of reducing the amount of solvent and being capable of mass processing, and the polyester fiber and elastic fiber obtained after the treatment can be recycled and reused.

In one aspect, the present disclosure provides a treatment method of waste fabric containing polyester fiber and elastic fiber, which includes the following steps. A waste fabric containing a polyester fiber and an elastic fiber is provided. A first-stage separation treatment is performed on the waste fabric. The first-stage separation treatment is to treat the waste fabric with a first polar solvent at a first temperature, so as to dissolve a part of the elastic fiber. The first polar solvent is collected after use, and a second-stage separation treatment is performed on the waste fabric after the first-stage separation treatment. The second-stage separation treatment is to treat the waste fabric with a second polar solvent at a second temperature after the first-stage separation treatment, so as to dissolve another part of the elastic fiber. The second polar solvent after use and the waste fabric after the second-stage separation treatment are collected. In addition, the second temperature is higher than the first temperature, and the first polar solvent and the second polar solvent are selected from a group consisting of dimethylformamide (DMF), dimethylacetamide (DMAC), N-methylpyrrolidone (NMP), γ-butyrolactone (GBL), and dimethylsulfoxide (DMSO).

In certain embodiments, the step of providing a waste fabric further includes dividing the waste fabric into a plurality of fabric scraps.

In certain embodiments, the elastic fiber is polyurethane elastic fiber, and the content of the elastic fiber in the waste fabric is from 2 wt % to 40 wt %.

In certain embodiments, a treatment time of the first-stage separation treatment is from 30 minutes to 120 minutes, and the first temperature is from 10° C. to 35° C.; and, a treatment time of the second-stage separation treatment is from 30 minutes to 120 minutes, and the second temperature is from 70° C. to 130° C.

In certain embodiments, in the step of first-stage separation treatment, the solid-liquid ratio of the waste fabric to the first polar solvent is 1:5-to-20; and, in the second-stage separation treatment, a solid-liquid ratio of the waste fabric after the first-stage separation treatment and the second polar solvent is 1:5-to-20.

In certain embodiments, the first polar solvent and the second polar solvent are each dimethylformamide or dimethylacetamide.

In certain embodiments, the first polar solvent and the second polar solvent are each a mixed solvent of dimethylformamide and dimethylacetamide, and the volume ratio of dimethylformamide to dimethylacetamide is 1:2.

In certain embodiments, the step of collecting the first polar solvent after use further includes recycling the part of the elastic fiber from the first polar solvent after use; the step of collecting the second polar solvent after use further includes recycling the another part of the elastic fiber from the second polar solvent after use; and, the step of collecting the waste fabric after the second-stage separation treatment further includes recycling the polyester fiber from the waste fabric after the second-stage separation treatment and producing the polyester fiber into polyester pellets.

In certain embodiments, the method further includes performing a third-stage separation treatment on the waste fabric after the second-stage separation treatment. The third-stage separation treatment is to treat the waste fabric after the second-stage separation treatment with a third polar solvent at a third temperature, so as to dissolve a remaining part of the elastic fiber. The third polar solvent after use and the waste fabric after the third-stage separation treatment are collected. In addition, the third temperature is higher than the second temperature, and the third polar solvent is selected from a group consisting of dimethylformamide, dimethylacetamide, N-methylpyrrolidone, γ-butyrolactone, and dimethylsulfoxide.

In certain embodiments, a treatment time of the first-stage separation treatment is from 30 minutes to 120 minutes, and the first temperature is from 10° C. to 35° C.; a treatment time of the second-stage separation treatment is from 30 minutes to 120 minutes, and the second temperature is from 45° C. to 60° C.; and, a treatment time of the third-stage separation treatment is from 30 minutes to 120 minutes, and the third temperature is from 70° C. to 130° C.

In certain embodiments, the first polar solvent, the second polar solvent, and the third polar solvent are each dimethylformamide or dimethylacetamide.

In certain embodiments, the first polar solvent, the second polar solvent, and the third polar solvent are each a mixed solvent of dimethylformamide and dimethylacetamide, and the volume ratio of dimethylformamide to dimethylacetamide is 1:2.

In certain embodiments, the step of collecting the first polar solvent after use further includes recycling the part of the elastic fiber from the first polar solvent after use; the step of collecting the second polar solvent after use further includes recycling the another part of the elastic fiber from the second polar solvent after use; the step of collecting the third polar solvent after use further includes recycling the remaining part of the elastic fiber from the second polar solvent after use; and, the step of collecting the waste fabric after the third-stage separation treatment further includes recycling the polyester fiber from the waste fabric after the third-stage separation treatment and producing the polyester fiber into polyester pellets.

Therefore, in the treatment method of waste fabric containing polyester fiber and elastic fiber provided by the present disclosure, by virtue of "treating the waste fabric with a first polar solvent at a first temperature to dissolve a part of the elastic fiber, treating the waste fabric after the first-stage separation treatment with a second polar solvent at a second temperature to dissolve another part of the elastic fiber, and collecting the first polar solvent, the second polar solvent and the waste fabric after the second-stage separation treatment" and "the first polar solvent and the second polar solvent being selected from a group consisting of dimethylformamide, dimethylacetamide, N-methylpyrrolidone, γ-butyrolactone, and dimethylsulfoxide," the separation and recycling of polyester fiber and elastic fiber can be achieved. In addition, compared with the conventional treatment method, the treatment method of the present disclosure greatly reduces the amount of solvents used, thereby reducing the production cost and the damage to the environment.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
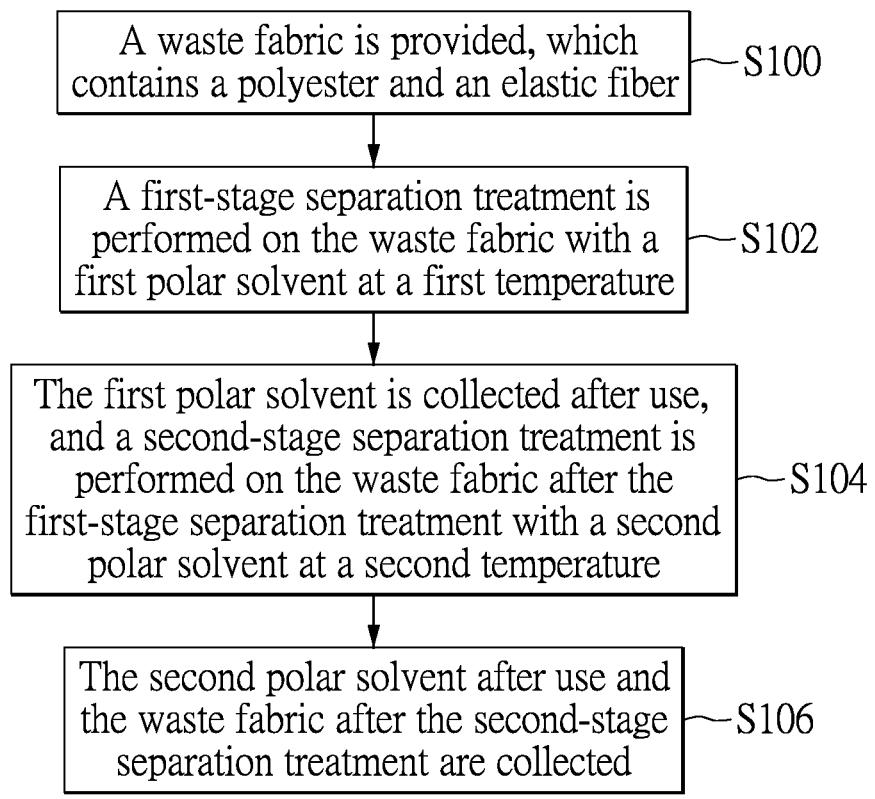
FIG. 1 is a flowchart of a treatment method according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Unless otherwise defined, the terms used in the present disclosure are the meanings commonly understood by those skilled in the art. The materials used in the following embodiments are commercially available materials unless otherwise specified. The operations or instruments used in the following examples are common operations or instruments in the art unless otherwise specified. The ratios, contents, etc. described in the following embodiments are by weight unless otherwise specified.

First Embodiment

Referring to FIG. 1, a first embodiment of the present disclosure provides a treatment method of waste fabric containing a polyester fiber and an elastic fiber, and the treatment method is to separate the elastic fiber from the waste fabric by a two-stage solvent treatment, thereby recycling the elastic fiber, and achieving the separation and recycling of polyester fibers and elastic fibers in waste fabrics. Referring to FIG. 1, the treatment method according to the first embodiment of the present disclosure includes the following steps. In step S100, a waste fabric which contains a polyester fiber and an elastic fiber is provided. In step S102, a first-stage separation treatment is performed on the waste fabric with a first polar solvent at a first temperature.

In step S104, the first polar solvent is collected after use, and a second-stage separation treatment is performed on the waste fabric with a second polar solvent at a second temperature after the first-stage separation treatment. In step S106, the second polar solvent after use and the waste fabric after the second-stage separation treatment are collected. The "waste fabric" mentioned herein can refer to discarded or used fabrics such as clothes, bed sheets, and so on, or to wastes generated in the textile production process such as scraps, pieces of cloth, and the like.

In step S100, the waste fabric can be a polyester fiber/elastic fiber blended fabric, the polyester fiber is such as polyethylene terephthalate (PET) fiber, and the elastic fiber is such as polyurethane elastic fiber (Spandex), but the present disclosure is not limited thereto. The content of polyester fiber in the waste fabric can be from 60 weight percent (wt %) to 98 wt %, and the content of elastic fiber in the waste fabric can be from 2 wt % to 40 wt %. In practice, the waste fabric can be divided into a plurality of fabric scraps, which can be cut or torn, and each of the fabric scraps contains polyester fiber and elastic fiber. In addition, the size of the fabric scraps may depend on subsequent processing conditions; for instance, the size of the fabric scraps may be 3 cm long by 3 cm wide. However, the aforementioned examples describe only one of the embodiments of the present disclosure, and the present disclosure is not intended to be limited thereto.

In step S102, the first-stage separation treatment can be to impregnate the waste fabric (or the fabric scraps) in the first polar solvent to form a mixed system of solid-liquid coexistence, and react at the first temperature for 30 minutes to 120 minutes, so that a part of the elastic fiber can be dissolved in the first polar solvent, while the polyester fiber is not affected. The first polar solvent can be selected from the group consisting of dimethylformamide (DMF), dimethylacetamide (DMAC), N-methylpyrrolidone (NMP), γ-butyrolactone (GBL) and dimethylsulfoxide (DMSO), and the first temperature can be from 10° C. to 35° C. To improve the efficiency of the first-stage separation treatment, the waste fabric (or the fabric scraps) can be uniformly dispersed in the first polar solvent, and the first polar solvent can be DMF or DMAC. In addition, the solid-liquid ratio of the waste fabric (or the fabric scraps) to the first polar solvent is controlled to be at 1:5-to-20, and the first temperature is controlled to be at 20° C. to 25° C.

Figure 2:
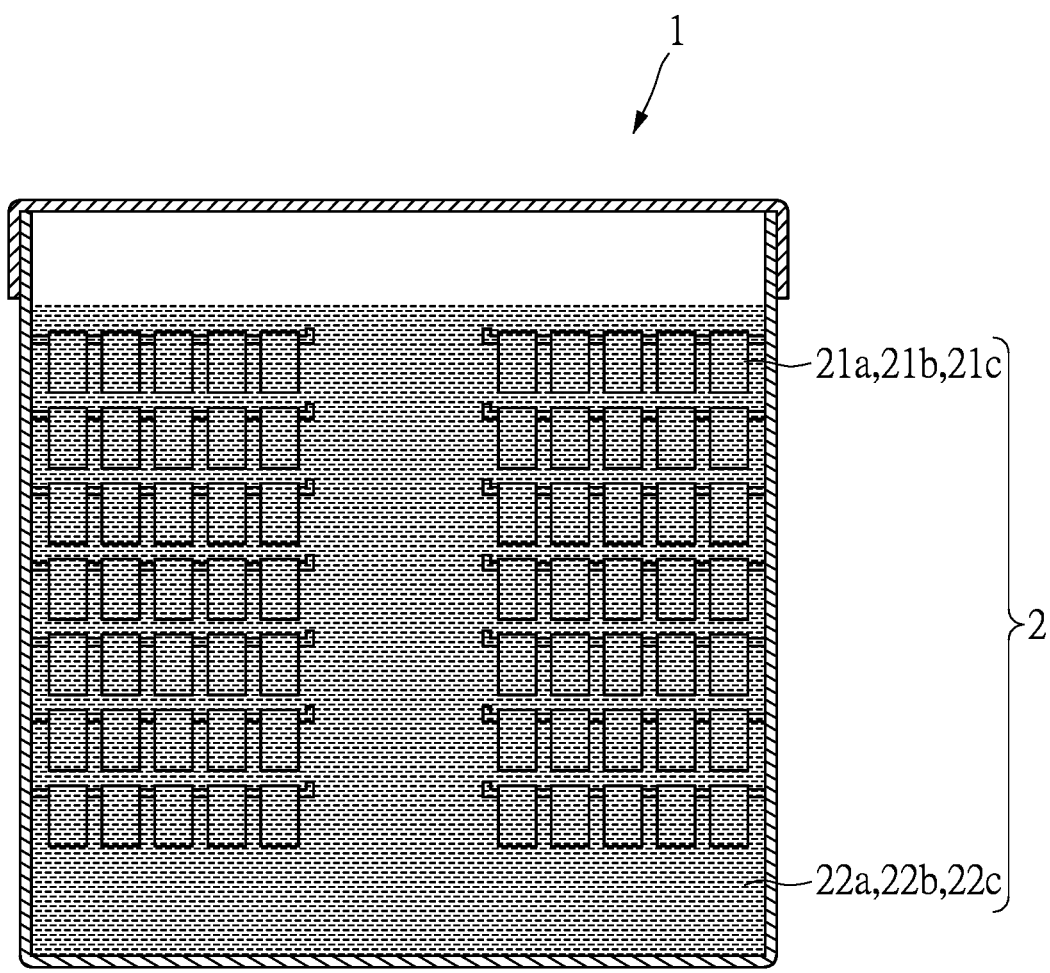
FIG. 2 shows an apparatus for implementing the treatment method of the first embodiment of the present disclosure.
Figure 3:
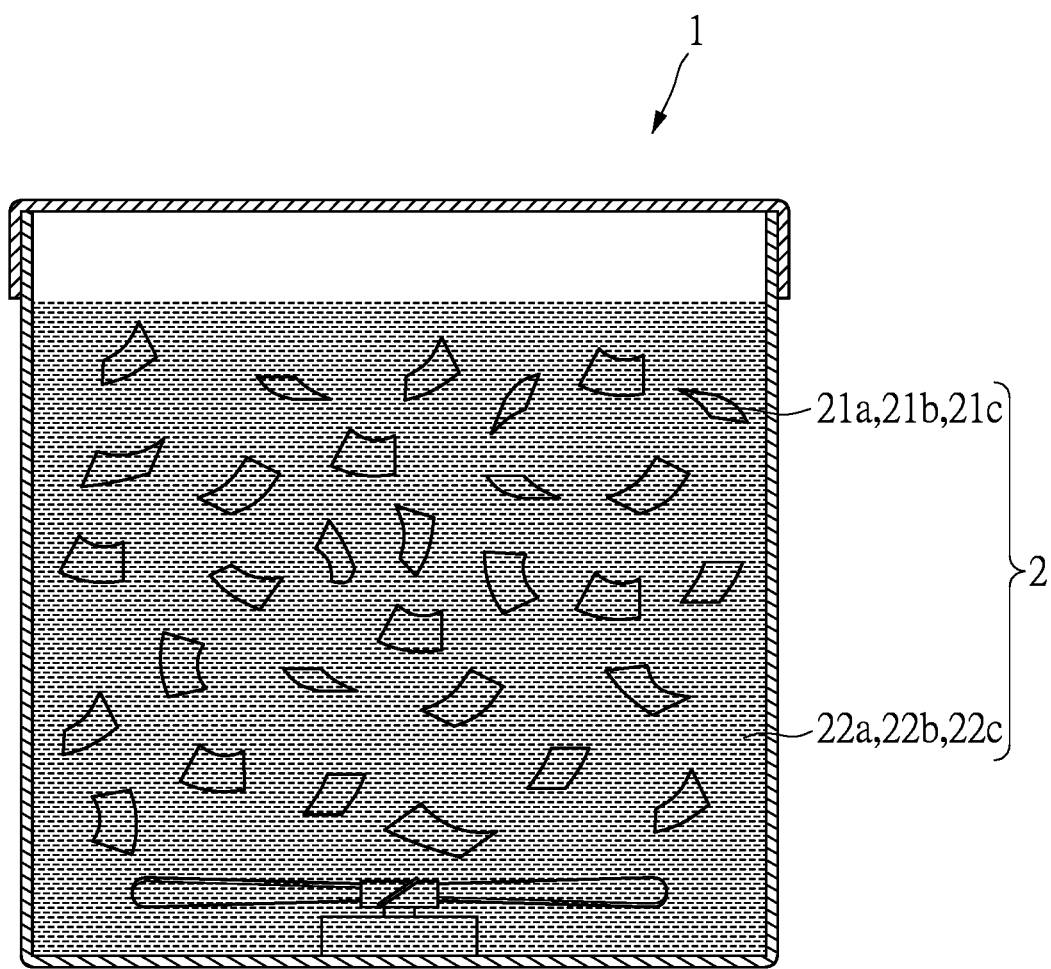
FIG. 3 shows another apparatus for implementing the treatment method of the first embodiment of the present disclosure.

Referring to FIG. 2 and FIG. 3, in the first-stage separation treatment, a mixed system 2 of the fabric scraps 21a and the first polar solvent 22a can be placed in a reactor 1 (such as a reaction tank) and then heated to 10° C. to 35° C. at a heating rate of 3° C./min with or without stirring, and the temperature is maintained for 30 minutes to 120 minutes. However, the present disclosure is not limited thereto. In some embodiments, the first polar solvent can be a mixed solvent of dimethylformamide and dimethylacetamide, and the volume ratio of dimethylformamide to dimethylacetamide is 1:2. It is worth mentioning that the mixed solvent has a good dissolving ability for elastic fiber (such as polyurethane elastic fiber) and has low toxicity.

In step S104, the second-stage separation treatment can be to impregnate the waste fabric (or the fabric scraps) after the first-stage separation treatment in the second polar solvent to form a mixed system of solid-liquid coexistence, and react at the second temperature for 30 minutes to 120 minutes, so that a remaining part of the elastic fiber can be dissolved in the second polar solvent together with dyes and residual impurities, while the polyester fiber is not affected. The second polar solvent can be selected from the group consisting of dimethylformamide (DMF), dimethylacetamide (DMAC), N-methylpyrrolidone (NMP), γ-butyrolactone (GBL) and dimethylsulfoxide (DMSO), and the second temperature can be 70° C. to 130° C. It should be noted that the second polar solvent used in the second-stage separation treatment can be the same as or different from the first polar solvent used in the first-stage separation treatment.

The first polar solvent used in the first-stage separation treatment can be washed with water, filtered, and dried to obtain the elastic fiber. The analysis results show that the first-stage separation treatment can recycle more than or equal to 75% of the elastic fiber, of which no polyester fiber is mixed, and the elastic fiber can be applied to fiber raw materials to be made into TPU products such as gymnastics cushions, furniture protection cushions, and so on, but is not limited thereto. In practice, about 5 times the amount of water of the first polar solvent can be added to separate the elastic fiber from the first polar solvent, and a first suction filtration is performed to separate the solid part and the liquid part. Then, the solid part is soaked in water for 3 minutes, the second suction filtration is carried out, and the elastic fiber is dried to obtain the elastic fiber.

To improve the efficiency of the second-stage separation treatment, the waste fabric (or the fabric scraps) can be uniformly dispersed in the second polar solvent, and the second polar solvent can be DMF or DMAC. In addition, the solid-liquid ratio of waste fabric (or the fabric scraps) to the second polar solvent is controlled to be at 1:5-to-20, and the second temperature is controlled to be at 110° C. to 120° C. It is worth mentioning that the treatment method of the present disclosure separates the elastic fiber from the waste fabric through a two-stage solvent treatment, which can not only reduce the amount of solvent used, reduce production costs and damage to the environment, but also improve the purity of the recycled polyester fiber.

Referring to FIG. 2 and FIG. 3, in the second-stage separation treatment, the mixed system 2 of fabric scraps after the first-stage separation treatment 21b and second polar solvent 22b can be placed in the reactor 1 (such as a reaction tank) and then heated to 70° C. to 130° C. at a heating rate of 3° C./min with or without stirring and the temperature is maintained for 30 minutes to 120 minutes. However, the present disclosure is not limited thereto. In some embodiments, the second polar solvent can be a mixed solvent of dimethylformamide and dimethylacetamide, and the volume ratio of dimethylformamide to dimethylacetamide is 1:2.

In step S106, the second polar solvent used in the second-stage separation treatment can be washed with water, filtered, and dried to obtain the elastic fiber. The analysis results show that the second-stage separation treatment can recycle more than or equal to 8% of the elastic fiber, of which no polyester fiber is mixed, and the elastic fiber can be applied to fiber raw materials to be made into TPU products such as gymnastics cushions, furniture protection cushions, and so on, but is not limited thereto. Similarly, about 5 times the amount of water of the second polar solvent can be added to separate the elastic fiber from the second polar solvent, and the first suction filtration is performed to separate the solid and part the liquid part. Then, the solid part is soaked in water for 3 minutes, the second suction filtration is carried out, and the elastic fiber is dried to obtain the elastic fiber.

In addition, basically only the polyester fiber remains in the waste fabric (or the fabric scraps) after the second-stage separation treatment, which can be washed, filtered, and dried to obtain the polyester fiber. The polyester fiber can be depolymerized into monomer and/or oligomer by physical or chemical reproduction, and then re-polymerized into recycled polyester pellets (r-PET). The analysis results show that the recycling rate of the monomer and/or oligomer obtained after depolymerization can reach more than or equal to 95%, and no elastic fiber is mixed into them. After step S106 is completed, the separation and recycling of polyester fiber and elastic fiber are achieved. In practice, the number of washings required for the waste fabric (or the fabric scraps) after the second-stage separation treatment can be 3 times, and the solid-liquid ratio (ratio of fabric to water) for each washing can be 1:5. After washing with water, suction filtration can be performed to separate the solid part and liquid part, the solid part is soaked in water for 3 minutes and repeated for three times, and dried at 100° C. to obtain the polyester fiber.

Further, a physical reproduction manner can be to use an extruder to melt the processed the waste fabric (or the fabric scraps) and then extrude them into pellets. In addition, a chemical reproduction manner can be to use a chemical depolymerization solution to depolymerize the polyester fiber in the waste fabric (or the fabric scraps) first, and monomer and/or oligomer obtained after depolymerization are then repolymerized under specific conditions, and then pelletized. The chemical depolymerization solution can be water, methanol, ethanol, ethylene glycol, diethylene glycol, or any combination thereof, but is not limited thereto.

Second Embodiment

Figure 4:
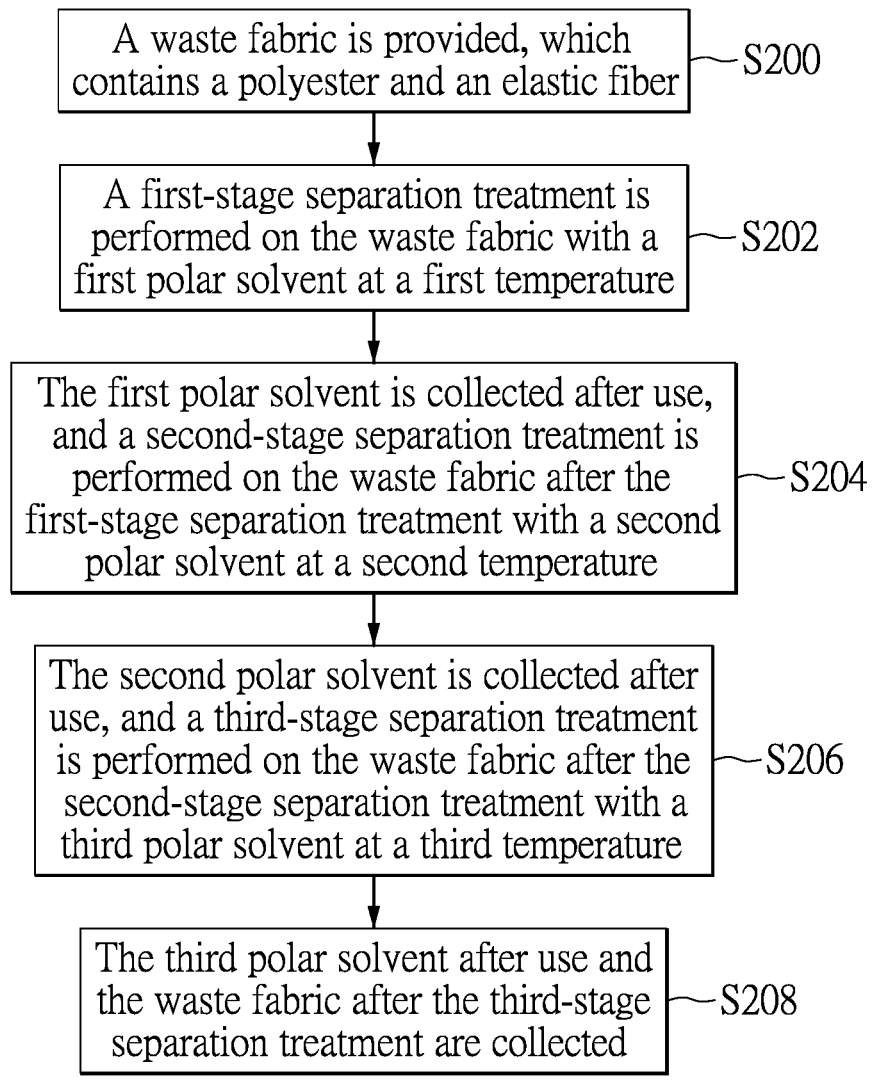
FIG. 4 is a flowchart of a treatment method according to a second embodiment of the present disclosure.

Referring to FIG. 4, a second embodiment of the present disclosure provides a treatment method of waste fabric containing a polyester fiber and an elastic fiber, and the treatment method is to separate the elastic fiber from the waste fabric by at least a two-stage solvent treatment, thereby recycling the elastic fiber, and achieving the separation and recycling of polyester fibers and elastic fibers in waste fabrics. Referring to FIG. 4, the treatment method according to the first embodiment of the present disclosure includes the following steps. In step S200, a waste fabric is provided, which contains a polyester fiber and an elastic fiber. In step S202, a first-stage separation treatment is performed on the waste fabric with a first polar solvent at a first temperature. In step S204, the first polar solvent is collected after use, and a second-stage separation treatment is performed on the waste fabric with a second polar solvent at a second temperature after the first-stage separation treatment. In step S206, the second polar solvent is collected after use, and a third-stage separation treatment is performed on the waste fabric after the second-stage separation treatment with a third polar solvent at a third temperature. In step S208, the third polar solvent after use and the waste fabric after the third-stage separation treatment are collected.

In step S200, the waste fabric can be a polyester fiber/elastic fiber blended fabric, the polyester fiber is such as polyethylene terephthalate (PET) fiber, and the elastic fiber is such as polyurethane elastic fiber (spandex), but the present disclosure is not limited thereto. The content of polyester fiber in the waste fabric can be from 60 weight percent (wt %) to 98 wt %, and the content of elastic fiber in the waste fabric can be from 2 wt % to 40 wt %. In practice, the waste fabric can be divided into a plurality of fabric scraps, which can be cut or torn, and each of the fabric scraps contains polyester fiber and elastic fiber. In addition, the size of the fabric scraps may depend on subsequent processing conditions; for instance, the size of the fabric scraps may be 3 cm long by 3 cm wide. However, the aforementioned examples describe only one of the embodiments of the present disclosure, and the present disclosure is not intended to be limited thereto.

In step S202, the first-stage separation treatment can be to impregnate the waste fabric (or the fabric scraps) in the first polar solvent to form a mixed system of solid-liquid coexistence, and react at the first temperature for 30 minutes to 120 minutes, so that a part of the elastic fiber can be dissolved in the first polar solvent, while the polyester fiber is not affected. The first polar solvent can be selected from the group consisting of dimethylformamide (DMF), dimethylacetamide (DMAC), N-methylpyrrolidone (NMP), γ-butyrolactone (GBL) and dimethylsulfoxide (DMSO), and the first temperature can be from 10° C. to 35° C. To improve the efficiency of the first-stage separation treatment, the waste fabric (or the fabric scraps) can be uniformly dispersed in the first polar solvent, and the first polar solvent can be DMF or DMAC. In addition, the solid-liquid ratio of the waste fabric (or the fabric scraps) to the first polar solvent is controlled to be at 1:5-to-20, and the first temperature is controlled to be at 20° C. to 25° C.

Referring to FIG. 2 and FIG. 3, in the first-stage separation treatment, a mixed system 2 of the fabric scraps 21a and the first polar solvent 22a can be placed in a reactor 1 (such as a reaction tank) and then heated to 10° C. to 35° C. at a heating rate of 3° C./min with or without stirring, and the temperature is maintained for 30 minutes to 120 minutes. However, the present disclosure is not limited thereto. In some embodiments, the first polar solvent can be a mixed solvent of dimethylformamide and dimethylacetamide, and the volume ratio of dimethylformamide to dimethylacetamide is 1:2. It is worth mentioning that the mixed solvent has a good dissolving ability for elastic fiber (such as polyurethane elastic fiber).

In step S204, the second-stage separation treatment can be to impregnate the waste fabric (or the fabric scraps) after the first-stage separation treatment in the second polar solvent to form a mixed system of solid-liquid coexistence, and react at the second temperature for 30 minutes to 120 minutes, and the second temperature is higher than the first temperature, so that another part of the elastic fiber can be dissolved in the second polar solvent, while the polyester fiber is not affected. The second polar solvent can be selected from the group consisting of dimethylformamide (DMF), dimethylacetamide (DMAC), N-methylpyrrolidone (NMP), γ-butyrolactone (GBL) and dimethylsulfoxide (DMSO), and the second temperature can be 45° C. to 60° C. It should be noted that the second polar solvent used in the second-stage separation treatment can be the same as or different from the first polar solvent used in the first-stage separation treatment.

The first polar solvent used in the first-stage separation treatment can be washed with water, filtered, and dried to obtain the elastic fiber. The implementation details can be referred to as in the first embodiment, and will not be reiterated herein. The analysis results show that the first-stage separation treatment can recycle more than or equal to 75% of the elastic fiber, of which no polyester fiber is mixed, and the elastic fiber can be applied to fiber raw materials to be made into TPU products such as gymnastics cushions, furniture protection cushions, and so on, but is not limited thereto.

To improve the efficiency of the second-stage separation treatment, the waste fabric (or the fabric scraps) can be uniformly dispersed in the second polar solvent, and the second polar solvent can be DMF or DMAC. In addition, the solid-liquid ratio of the waste fabric (or the fabric scraps) to the second polar solvent is controlled to be at 1:5-to-20, and the second temperature is controlled to be at 50° C. to 55° C.

In the second-stage separation treatment, referring to FIG. 2 and FIG. 3, the mixed system 2 of the fabric scraps after the first-stage separation treatment 21b and the second polar solvent 22b can be placed in the reactor 1 (such as a reaction tank) and then heated to 45° C. to 60° C. at a heating rate of 3° C./min with or without stirring and the temperature is maintained for 30 minutes to 120 minutes. However, the present disclosure is not limited thereto. In some embodiments, the second polar solvent can be a mixed solvent of dimethylformamide and dimethylacetamide, and the volume ratio of dimethylformamide to dimethylacetamide is 1:2.

In step S206, the third-stage separation treatment can be to impregnate the waste fabric (or the fabric scraps) after the second-stage separation treatment in the third polar solvent to form a mixed system of solid-liquid coexistence, and react at the third temperature for 30 minutes to 120 minutes, and the third temperature is higher than the second temperature, so that a remaining part of the elastic fiber can be dissolved in the third polar solvent together with dyes and residual impurities, while the polyester fiber is not affected. The third polar solvent can be selected from the group consisting of dimethylformamide (DMF), dimethylacetamide (DMAC), N-methylpyrrolidone (NMP), γ-butyrolactone (GBL) and dimethylsulfoxide (DMSO), and the third temperature can be 70° C. to 130° C. It should be noted that the third polar solvent used in the third-stage separation treatment can be the same as or different from the first polar solvent used in the first-stage separation treatment (i.e., the second polar solvent used in the second-stage separation treatment).

The second polar solvent used in the second-stage separation treatment can be washed with water, filtered, and dried to obtain the elastic fiber. The implementation details can be referred to as in the first embodiment, and will not be reiterated herein. The analysis results show that the second-stage separation treatment can recycle more than or equal to 4.7% of the elastic fiber, of which no polyester fiber is mixed, and the elastic fiber can be applied to fiber raw materials to be made into TPU products such as gymnastics cushions, furniture protection cushions, and so on, but is not limited thereto.

To improve the efficiency of the third-stage separation treatment, the waste fabric (or the fabric scraps) can be uniformly dispersed in the third polar solvent, and the third polar solvent can be DMF or DMAC. In addition, the solid-liquid ratio of the waste fabric (or the fabric scraps) to the third polar solvent is controlled to be at 1:5-to-20, and the third temperature is controlled to be at 105° C. to 115° C. It is worth mentioning that the treatment method of the present disclosure separates the elastic fiber from the waste fabric through a three-stage solvent treatment, which can not only reduce the amount of solvent used, reduce production costs and damage to the environment, but also improve the purity of the recycled polyester fiber.

In the third-stage separation treatment, referring to FIG. 2 and FIG. 3, the mixed system 2 of the fabric scraps after the second-stage separation treatment 21c and the third polar solvent 22c can be placed in the reactor 1 (such as a reaction tank) and then heated to 70° C. to 130° C. at a heating rate of 3° C./min with or without stirring and the temperature is maintained for 30 minutes to 120 minutes. However, the present disclosure is not limited thereto. In some embodiments, the third polar solvent can be a mixed solvent of dimethylformamide and dimethylacetamide, and the volume ratio of dimethylformamide to dimethylacetamide is 1:2.

In the step S208, the third polar solvent used in the third-stage separation treatment can be washed with water, filtered, and dried to obtain the elastic fiber. In addition, basically only the polyester fiber remains in the waste fabric (or the fabric scraps) after the third-stage separation treatment, which can be washed, filtered, and dried to obtain the polyester fiber. The implementation details can be referred to as in the first embodiment, and will not be reiterated herein. The polyester fiber can be depolymerized into monomer and/or oligomer by physical or chemical reproduction, and then re-polymerized into recycled polyester pellets (r-PET). The analysis results show that the recycling rate of the monomer and/or oligomer obtained after depolymerization can reach more than or equal to 95%, and no elastic fiber is mixed into them. After step S208 is completed, the separation and recycling of polyester fiber and elastic fiber are achieved.

Further, a physical reproduction manner can be to use an extruder to melt the processed the waste fabric (or the fabric scraps) and then extrude them into pellets. In addition, a chemical reproduction manner can be to use a chemical depolymerization solution to depolymerize the polyester fiber in the waste fabric (the fabric scraps) first, and monomer and/or oligomer obtained after depolymerization are then repolymerized under specific conditions, and then pelletized. The chemical depolymerization solution can be water, methanol, ethanol, ethylene glycol, diethylene glycol, or any combination thereof, but is not limited thereto.

Beneficial Effects of the Embodiments

In conclusion, in the treatment method of waste fabric containing polyester fiber and elastic fiber provided by the present disclosure, by virtue of "treating the waste fabric with a first polar solvent at a first temperature to dissolve a part of the elastic fiber, treating the waste fabric after the first-stage separation treatment with a second polar solvent at a second temperature to dissolve another part of the elastic fiber, and collecting the first polar solvent, the second polar solvent and the waste fabric after the second-stage separation treatment" and "the first polar solvent and the second polar solvent being selected from a group consisting of dimethylformamide, dimethylacetamide, N-methylpyrrolidone, γ-butyrolactone, and dimethylsulfoxide," the separation and recycling of polyester fiber and elastic fiber can be achieved.

Further, the treatment method of the present disclosure separates the elastic fiber from the waste fabric through a two-stage solvent treatment, which can not only reduce the amount of solvent used, reduce production costs and damage to the environment, but also improve the purity of the recycled polyester fiber.

Furthermore, the treatment method of the present disclosure assists in achieving the recycling of fabric resources and has significant economic benefits, thereby meeting the requirements of industrialized production.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A treatment method, comprising:
   providing a waste fabric containing a polyester fiber and an elastic fiber;
   performing a first-stage separation treatment on the waste fabric using a first polar solvent at 10° C. to 35° C. for 30 minutes to 120 minutes, so as to dissolve a part of the elastic fiber;
   collecting the first polar solvent after being used, and performing a second-stage separation treatment on the waste fabric that has undergone the first-stage separation treatment, using a second polar solvent at 70° C. to 130° C. for 30 minutes to 120 minutes, so as to dissolve another part of the elastic fiber; and
   collecting the second polar solvent after being used;
   wherein more than or equal to 75% of the elastic fiber is recycled from the first polar solvent after being used, and more than or equal to 8% of the elastic fiber is recycled from the second polar solvent after being used;
   wherein the first polar solvent and the second polar solvent are selected from a group consisting of dimethylformamide, dimethylacetamide, N-methylpyrrolidone, γ-butyrolactone, and dimethylsulfoxide.

2. The treatment method according to claim 1, wherein the step of providing a waste fabric further includes dividing the waste fabric into a plurality of fabric scraps.

3. The treatment method according to claim 1, wherein the elastic fiber is a polyurethane elastic fiber, and the content of the elastic fiber in the waste fabric is from 2 wt % to 40 wt %.

4. The treatment method according to claim 1, wherein, in the step of first-stage separation treatment, the solid-liquid ratio of the waste fabric to the first polar solvent is 1:5-to-20; and, in the second-stage separation treatment, a solid-liquid ratio of the waste fabric that has undergone the first-stage separation treatment and the second polar solvent is 1:5-to-20.

5. The treatment method according to claim 4, wherein the first polar solvent and the second polar solvent are each dimethylformamide or dimethylacetamide.

6. The treatment method according to claim 5, wherein the first polar solvent and the second polar solvent are each a mixed solvent of dimethylformamide and dimethylacetamide, and the volume ratio of dimethylformamide to dimethylacetamide is 1:2.

7. The treatment method according to claim 1, wherein after the step of performing the second-stage separation treatment, the treatment method further includes: collecting the waste fabric that has undergone the second-stage separation treatment; recycling the polyester fiber from the waste fabric that has undergone the second-stage separation treatment; and
   producing the polyester fiber into polyester pellets.

8. The treatment method according to claim 1, further including:
   performing a third-stage separation treatment on the waste fabric that has undergone the second-stage separation treatment, using a third polar solvent, so as to dissolve a remaining part of the elastic fiber; and
   collecting the third polar solvent after being used and the waste fabric that has undergone the third-stage separation treatment;
   wherein the third polar solvent is selected from a group consisting of dimethylformamide, dimethylacetamide, N-methylpyrrolidone, γ-butyrolactone, and dimethylsulfoxide.

9. The treatment method according to claim 8, wherein the first polar solvent, the second polar solvent, and the third polar solvent are each dimethylformamide or dimethylacetamide.

10. The treatment method according to claim 9, wherein the first polar solvent, the second polar solvent, and the third polar solvent are each a mixed solvent of dimethylformamide and dimethylacetamide, and the volume ratio of dimethylformamide to dimethylacetamide is 1:2.

11. The treatment method according to claim 8, wherein the step of collecting the third polar solvent after being used further includes recycling the remaining part of the elastic fiber from the third polar solvent after being used, and the step of collecting the waste fabric that has undergone the third-stage separation treatment further includes recycling the polyester fiber from the waste fabric that has undergone the third-stage separation treatment and producing the polyester fiber into polyester pellets.

* * * * *